April 28, 1942.   J. W. FITZ GERALD   2,281,277
DRIVE TRANSMISSION
Filed Dec. 30, 1940

Inventor
John W. FitzGerald

Patented Apr. 28, 1942

2,281,277

UNITED STATES PATENT OFFICE 2,281,277

DRIVE TRANSMISSION

John W. Fitz Gerald, Milwaukee, Wis., assignor to Briggs & Stratton Corporation, Milwaukee, Wis., a corporation of Delaware Application December 30, 1940, Serial No. 372,279

2 Claims. (Cl. 74—214)

This invention relates to improvements in drive transmissions suitable for general use but especially adapted to engine starters.

In present day engine starters of the automatic type, which, because of its low cost is used considerably more than the manual type, a pinion is automatically axially propelled into mesh with the engine ring gear. The possibility of clashing or improper meshing of the gears and appreciable noise is thus inevitable, and although recent developments have greatly minimized these objections, they still exist.

With a view toward overcoming these objections it has been proposed from time to time to substitute frictional driving members for the toothed pinion and gear, but heretofore all such proposals have involved a construction wherein at least one of the cooperating drive members had a conical surface to be brought into frictional driving engagement with the other member upon axial shifting of one or both of the members.

A wedge-like engagement was thus effected between the contacting surfaces. This gave rise to a very serious objection, for at all portions of the conical surface except that lying on a theoretical median transverse plane, slippage would have to occur between the engaging surfaces. Consequently a transmission built along those lines could not stand up in service. The continual slippage would soon wear the surfaces to the point of uselessness.

It is, therefore, an object of this invention to provide a frictional drive transmission suitable for general use but especially well adapted for use in engine starters and similar installations, wherein the contacting surfaces of the two driving members contact with a rolling action entirely free from slippage.

More specifically, it is an object of this invention to provide a drive transmission of the character described wherein the cooperating driving members have a uniform diameter as distinguished from previous transmissions of this type wherein the drive surface of at least one of the cooperating members was conical.

Another object of this invention is to provide a drive transmission of the character described wherein the establishment of a driving connection is effected without necessitating lateral or axial bodily shifting of either of the two cooperating members. In this connection it is a further object of the present invention to provide a drive transmission wherein the establishment of a driving connection is effected by expanding one of the members radially.

Another object of this invention resides in the provision of an expansible drive pulley composed partially of an elastic body having a circular outer surface and capable of axial compression to effect radial expansion and consequent frictional driving engagement with a cooperating pulley.

Another object of this invention resides in the provision of a novel manner of transmitting driving force from a shaft to an elastic collar mounted on the shaft.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention, constructed in accordance with the best mode so far devised for the practical application of the principles thereof, and in which.

Figure 1:
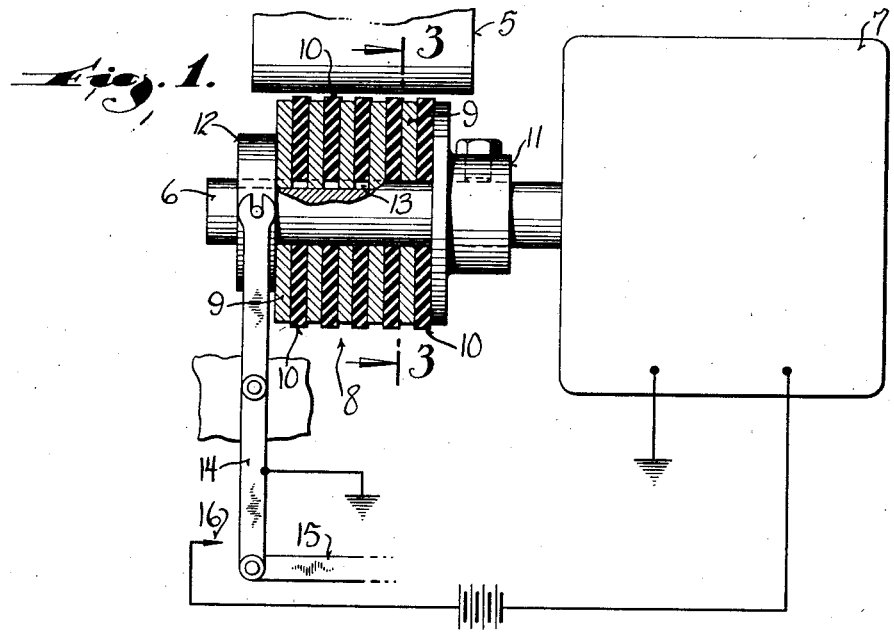
Figure 1 is a view partly in side elevation and partly in section of a drive transmission constructed in accordance with this invention, said view showing the drive in its inoperative condition.

Referring now particularly to the accompanying drawing, in which like numerals indicate like parts, the numeral 5 designates a driven pulley which may be the flywheel of an internal combustion engine. The outer surface of this pulley is a regular surface of rotation and the axis about which the pulley turns is fixed.

Adjacent to the outer peripheral surface of the pulley 5 is a drive shaft 6. This shaft is mounted in fixed bearings (not shown) which hold it in an axially fixed position parallel to the axis of the pulley 5. If the invention is applied to an engine starter for automobiles and the like, the drive shaft 6 may be the shaft of a starter motor 7.

Mounted on the shaft 6 is an expanding pulley designated generally by the numeral 8. This pulley comprises a plurality of alternate metal and rubber washers or discs 9 and 10, respectively, assembled on the shaft between a fixed collar 11 secured to the shaft and a movable collar 12 slidable on the shaft.

The metal discs or washers are keyed to the shaft as at 13 but the rubber discs or washers are not. Driving force is transmitted from the shaft to the rubber discs or washers through friction established and maintained by placing the assembly in axial compression. The advantages of a multiple plate clutch are thus obtained and slippage between the drive shaft and the rubber or elastic discs or washers is prevented.

As will appear from Figure 1 the elastic discs or washers 10 are slightly larger in diameter than the metal washers 9 so that their peripheral edges jointly form the driving surface of the pulley. However, the effective diameter of the pulley is normally insufficient to contact the pulley 5. In other words, the diameter of the elastic discs in the normal inoperative condition of the pulley is not great enough to engage the surface of the pulley 5; but inasmuch as the effective diameter of the pulley depends upon the state of compression of the assembly it may be expanded into driving engagement with the pulley 5 when desired.

Figure 2:
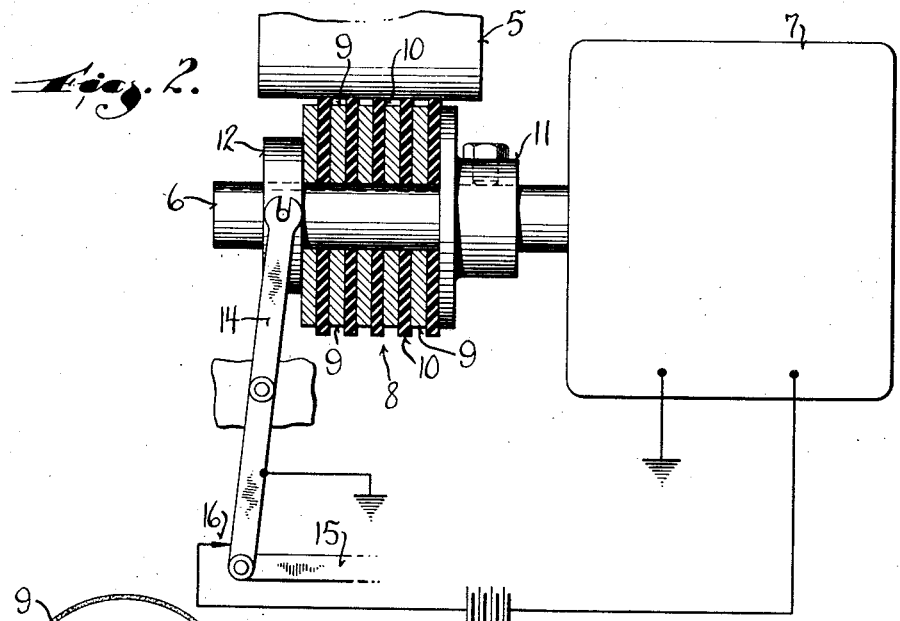
Figure 2 is a view similar to Figure 1 but showing the parts in their operative positions with the drive pulley expanded into driving engagement with the driven pulley.
Figure 3:
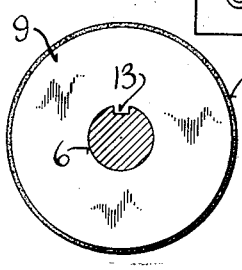
Figure 3 is a detail sectional view through Figure 1 on the plane of the line 3—3.

This is accomplished by placing the pulley assembly under axial compression which expands the elastic discs or washers radially into frictional driving engagement with the pulley 5 as shown in Figure 2.

Thus through control of the state of axial compression of the driving pulley, complete control over the drive transmission may be maintained. Any suitable manner of placing the assembly in axial compression may be used, and for purposes of illustration the movable collar 12 is shown as being actuated by a medially pivoted lever 14 to which an actuator 15 is attached.

While in the description thus far, the pulley 5 is stated to be the driven pulley and the pulley 8 the driver, it is of course apparent that the functions of these two pulleys may be reversed.

If the transmission is used as an engine starter, the motion of the mechanism employed for compressing the pulley 8 to establish the driving connection may be used to close the switch controlling the motor 7. The specific switch structure employed for this purpose forms no part of this invention, but to illustrate the combination the lever 14 has been illustrated as being grounded and engageable with a contact 16 to complete the motor circuit upon actuation of the lever in the direction necessary to expand the pulley 8 as clearly shown in Figure 2.

From the foregoing description, taken in connection with the accompanying drawing, it will be readily apparent that this invention provides an exceedingly simple but effective expanding pulley type transmission which has all the advantages of a frictional drive without the disadvantages inherent in previous constructions and resulting primarily from slippage between the contacting surfaces. It is further apparent that this invention is admirably suited for use in automobile engine starters and when so used, all shock of starting will be eliminated.

What I claim as my invention is:

1. In a drive transmission: a pulley rotatable about a fixed axis and having an annular surface; a shaft rotatable on a fixed axis parallel with the axis of the pulley; means for selectively drivingly connecting and disconnecting said pulley and the shaft, said means comprising a shoulder on the shaft; a plurality of alternate rubber and metal washers assembled on the shaft with one end of the assembly bearing against the shoulder, the rubber washers being loose with respect to the shaft and the metal washers being keyed thereto, said washer assembly being opposite the annular surface of the pulley, the metal washers having a diameter such as to leave substantial clearance between them and the annular surface of the pulley and the rubber washers having a normal free diameter at least as great as the metal washers but insufficient to contact the annular surface of the pulley; and means for controlling the diameter of said rubber washers regardless of rotation of the shaft, said last named means including a part movable longitudinally of the shaft toward the shoulder thereon to place said assembly of washers under axial compression and thereby expand the rubber washers radially into driving engagement with the annular surface of the pulley, said part being movable away from said shoulder to relieve the rubber washers of axial compressive and peripheral torsional forces.

2. In a drive transmission: a member rotatable about a fixed axis and having a surface concentric to said axis; a shaft substantially parallel with said axis and having a portion opposite said surface of rotation; spaced collars on the shaft; an expansible pulley mounted on the shaft between the collars for selectively drivingly connecting and disconnecting said member and the shaft, said expansible pulley comprising at least two washers of elastic material with a non-yielding washer interposed therebetween and keyed to the shaft, the diameter of said washers being such that their periphery lies close to but is spaced from the surface of rotation of said rotatable member when the yieldable washers are in their free state; and means for placing the expanding pulley assembly in compression between the collars to simultaneously expand the elastic washers radially to a larger diameter than said non-yielding washers and into driving engagement with said surface of rotation and to frictionally bind the elastic washers to the non-yielding washer, said means including a part exteriorly of the pulley assembly so that the pulley assembly may be actuated between its operative and inoperative positions regardless of rotation of the shaft.

JOHN W. FITZ GERALD.